D. N. GOFF.
Trimming Percussion-Caps.
No. 67,190. Patented July 30, 1867.
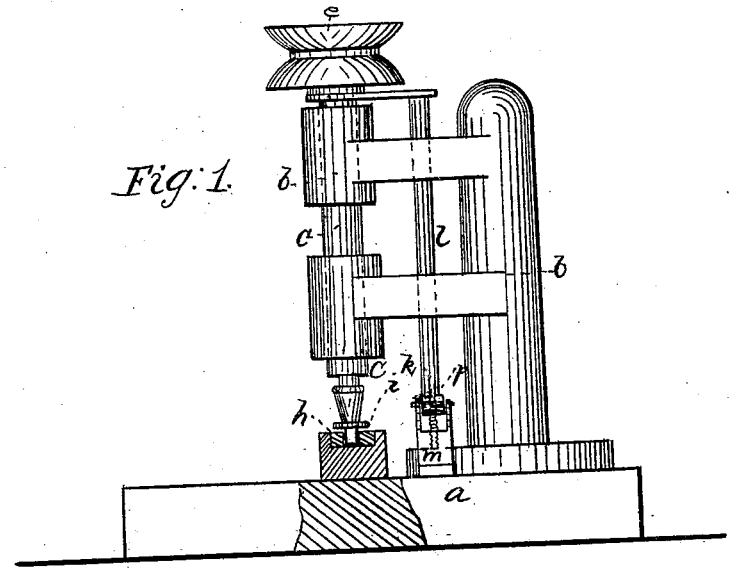
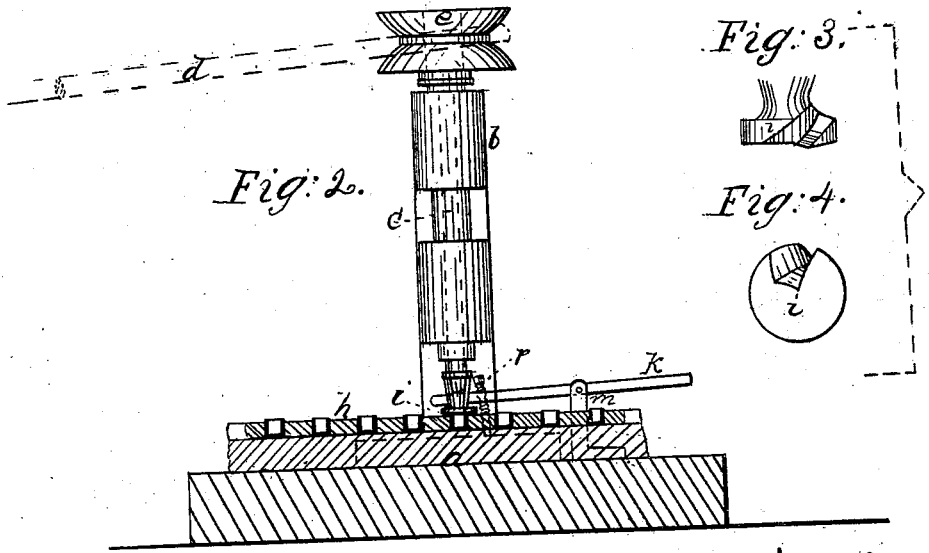
Witnesses  Inventor

United States Patent Office.

DERICK N. GOFF, OF WOLCOTTVILLE, CONNECTICUT.

*Letters Patent No. 67,190, dated July 30, 1867.*

---

IMPROVEMENT IN MACHINE FOR TRIMMING PERCUSSION-CAPS.

---

*The Schedule referred to in these Letters Patent and making part of the same.*

---

TO ALL WHOM IT MAY CONCERN:

Be it known that I, DERICK N. GOFF, of Wolcottville, in the county of Litchfield, and State of Connecticut, have invented, made, and applied to use, a certain new and useful Improvement in Machinery for Trimming Percussion-Caps; and I do hereby declare the following to be a full, clear, and exact description of the said invention, reference being had to the annexed drawing, making part of this specification, wherein—

Figure 1 is a side view, and

Figure 2 is a front view of my trimming machine, the bed being shown in section.

Figure 3 is a side view, and

Figure 4 is an inverted plan of the cutter employed by me in larger size.

Similar letters denote the same parts.

Percussion-caps that are made of a heavy quality of sheet metal have to be smoothed off at the ends, because the drawing or shaping the caps with a ribbed surface leaves the end of the cap rough and unequal. To dress these ends off a revolving burr has been used, also an emery-wheel, and in some instances the cap has been revolved while a standing cutter has been brought into contact with said cap. Some of these devices have not proved successful, while others have been complicated and costly.

The nature of my said invention consists in a revolving cutting edge, in combination with a die to hold the cap while the revolving cutting edge turns off a fine shaving from the end of the cap and smooths the same. By this means the dies holding the caps can be moved along progressively, and the caps dressed with rapidity, the whole mechanism being cheap, simple, and durable.

In the drawing, $a$ represents the bed, upon which is a standard, $b$, carrying the spindle $c$, that is rotated by a belt, $d$. To the pulley $e$ and at the lower end of the spindle $c$, is a cutting tool, $i$, formed, as shown in enlarged size in figs. 3 and 4, with a cutting edge nearly on the radial line, and slightly inclined upwards on its under side, so as to form a chisel-shaped tool that will cut a fine shaving from the end of the cap when presented below the revolving cutter $i$. The caps are conveyed beneath the revolving cutter $i$ by a feed or slide, $h$, containing dies that hold the caps in position, and this feed or slide is moved along progressively. The caps are to be placed in the same in any convenient manner, and the dies containing them are to be moved along by any desired mechanism. The belt $d$ is to be led at a slight inclination downward, so as to give the required force to hold the cutter to its work, and the lever $k$, rod $l$, and fork $m$, are employed to raise the cutter to allow the next cap to be brought below the revolving cutter, and a set-screw, $p$, is employed to determine the point to which the said cutter may descend. The cutting tool $i$ may be formed with two cutting edges of a chisel-shape, if desired.

What I claim, and desire to secure by Letters Patent, is—

A revolving cutter formed with a chisel edge, in combination with a die to hold a percussion-cap while the edge thereof is trimmed by the action of said revolving cutter, as set forth.

In witness whereof I have hereunto set my signature this 14th day of March, A. D. 1867.

DERICK N. GOFF.

Witnesses:
H. S. BARBOUR,
C. F. CHURCH.